United States Patent [19]

Disque

[11] Patent Number: 4,579,503
[45] Date of Patent: Apr. 1, 1986

[54] SIDELOADER ELEVATOR PLATFORM

[75] Inventor: Lawrence G. Disque, Loveland, Ohio

[73] Assignee: Leyman Manufacturing Corp., Cincinnati, Ohio

[21] Appl. No.: 548,230

[22] Filed: Nov. 2, 1983

[51] Int. Cl.$^4$ ............................................. B60P 1/44
[52] U.S. Cl. .................... 414/558; 414/546; 414/917
[58] Field of Search ............... 414/546, 549, 558, 917, 414/541; 74/89.17, 89.21, 422

[56] References Cited

U.S. PATENT DOCUMENTS

| | | | |
|---|---|---|---|
| 586,641 | 7/1897 | Underwood | 414/545 X |
| 758,493 | 4/1904 | Abbey | 414/545 X |
| 1,422,432 | 7/1922 | Forbes | 414/522 |
| 2,456,805 | 12/1948 | Wohlforth | 414/556 |
| 2,527,818 | 10/1950 | Ives | 414/557 |
| 2,683,545 | 7/1954 | Wood | 414/917 X |
| 2,732,960 | 1/1956 | Nilson | 414/556 X |
| 2,889,059 | 6/1959 | Selzer | 414/557 |
| 2,892,556 | 6/1959 | Lowe | 414/522 |
| 2,989,196 | 6/1961 | Lugash | 414/558 |
| 3,202,303 | 4/1965 | Chasar | 414/282 |
| 3,263,835 | 8/1966 | Lugash | 414/558 |
| 3,357,582 | 12/1967 | Wittek | 414/660 X |
| 3,369,678 | 2/1968 | Robinson | 414/558 |
| 3,371,805 | 3/1968 | Himes | 414/545 |
| 3,599,810 | 8/1971 | Pingsheim | 414/558 |
| 3,638,811 | 2/1972 | Robinson | 414/558 |
| 3,638,813 | 2/1972 | Strong et al. | 414/544 X |
| 3,721,355 | 3/1973 | Irving | 414/558 X |
| 3,791,541 | 2/1974 | Himes | 414/545 |
| 3,800,915 | 4/1974 | Himes | 414/545 |
| 3,804,276 | 4/1974 | Himes | 414/786 |
| 3,837,508 | 9/1974 | Stefanelli | 414/510 |
| 3,848,759 | 11/1974 | Goodacre et al. | 414/666 |
| 3,870,126 | 3/1975 | Himes | 414/545 X |
| 3,893,697 | 7/1975 | Blitz et al. | 414/546 X |
| 3,913,759 | 10/1975 | Deacon | 414/546 |
| 4,058,228 | 11/1977 | Hall | 414/549 |
| 4,087,007 | 5/1978 | Drews | 414/545 |
| 4,134,504 | 1/1979 | Salas et al. | 414/558 |

FOREIGN PATENT DOCUMENTS

| | | | |
|---|---|---|---|
| 182536 | 11/1982 | Japan | 414/549 |
| 182533 | 11/1982 | Japan | 414/549 |

*Primary Examiner*—Robert J. Spar
*Assistant Examiner*—Stuart J. Millman
*Attorney, Agent, or Firm*—Wood, Herron & Evans

[57] ABSTRACT

A sideloader elevator platform that is particularly structured to serve a cargo opening in the sidewall of, e.g., a truck body. The apparatus includes a platform connected with a novel carriage assembly that is slidable along rails mounted beneath the truck body's bed and transverse to that bed's longitudinal axis. The novel carriage assembly includes hydraulic rams that cooperate with parallelogram linkages for raising and lowering the elevator platform. A novel roller chain drive system functions to move the carriage assembly and platform on the rails between a travel or storage position entirely beneath the truck body's bed and an elevator use position where the platform is extended outward beyond the truck body's sidewall. A novel latch system insures the carriage assembly and platform is retained in the extended position when it is desired to use the platform as an elevator, and insures the carriage assembly and platform is retained wholly beneath the truck body's bed and above the axle centerline of the truck's wheels when in the travel position.

23 Claims, 6 Drawing Figures

SIDELOADER ELEVATOR PLATFORM

This invention relates to cargo platforms. More particularly, this invention relates to a cargo platform in combination with an elevating and storing mechanism for that platform.

Cargo platforms that are operable as elevators, and that are storable somewhere about the body of a vehicle, e.g., a truck, so as to be movable with the vehicle as it travels from one site to another, are well known in the prior art. Such cargo platforms may function solely as elevators, or they also may function as complete or partial closures in the form of doors or tailgates for the cargo area of the vehicle's body. During use such a cargo platform is, of course, movable between (1) a storage position where, depending on the structure of the platform, the platform may be folded upon itself beneath the vehicle's bed, the platform may be horizontally positioned beneath the vehicle's bed, the platform may be vertically disposed above the vehicle's bed so it at least partially closes the cargo opening of the body, or the platform may be horizontally disposed closely adjacent the ceiling of the vehicle's body, and (2) a horizontal or use position whereat the cargo area of the vehicle's body is readily accessible through a cargo opening, and whereat the cargo platform can be raised or lowered as an elevator.

When a cargo platform, in combination with a combined elevating and storing mechanism, is used as an elevator for the vehicle's body, the cargo platform is first moved from its storage position to its horizontal cargo handling position. Once in the horizontal cargo handling position, the platform may be moved up and down between the bed or floor of the vehicle and ground level or a loading dock. Such elevator like movement allows quick, efficient loading and unloading of the vehicle body's cargo space by providing lift means which permits the platform to be adjusted to a first loading level for easy transferal of the cargo onto the platform and, then, to be raised or lowered in a horizontal plane to a second level for easy transferal of the cargo off the platform.

In the case of a truck, it is well known to the prior art to mount such cargo platforms at the rear of the truck's body so as to serve the cargo opening at the rear of the truck's body. In this regard, particularly useful cargo platform systems especially structured to serve the rear cargo opening of a truck body are illustrated in U.S. Pat. Nos. 3,371,805, 3,791,541, 3,804,276, 3,800,915, and 3,870,126, all to W. H. Himes, and U.S. Pat. No. 4,087,007 to R. E. Drews, all of these patents being assigned to the assignee of this application.

In certain cargo handling situations, however, and particularly in connection with over-the-road trucks, i.e., trailers for over-the-road tractors, it is desirable that an elevator type cargo platform be provided in the sidewall of the truck's body. In other words, and in certain cargo handling situations, it is desirable that a truck's body have a cargo opening in one sidewall of that truck body where ingress and egress through that cargo opening is controlled by doors. This sidewall cargo opening normally is in addition to the rear cargo opening of the truck's body.

Accordingly, it has been the objective of this invention to provide a new and improved sideloader elevator platform particularly adapted for use with a cargo vehicle's body where the platform serves a cargo opening in the sidewall of that vehicle's body. In accord with this objective, the sideloader elevator platform of this invention includes a platform connected with a novel carriage assembly that is slidable along rails mounted beneath the vehicle body's bed and transverse to that bed's longitudinal axis. The novel carriage assembly includes hydraulic rams that cooperate with parallelogram linkages for raising and lowering the elevator platform. A novel roller chain drive system functions to move the carriage assembly and platform on the rails between a travel or storage position entirely beneath the vehicle body's bed and an elevator use position where the platform is extended outward beyond the vehicle body's sidewall. A novel latch system insures the carriage assembly and platform is retained in the extended position when it is desired to use the platform as an elevator, and insures the carriage assembly and platform is retained wholly beneath the vehicle body's bed and above the axle centerline of the vehicle's wheels when in the travel position.

Other objective and advantages of this invention will be more apparent from the following detailed description taken in conjunction with the drawings in which.

Figures 1, 2:
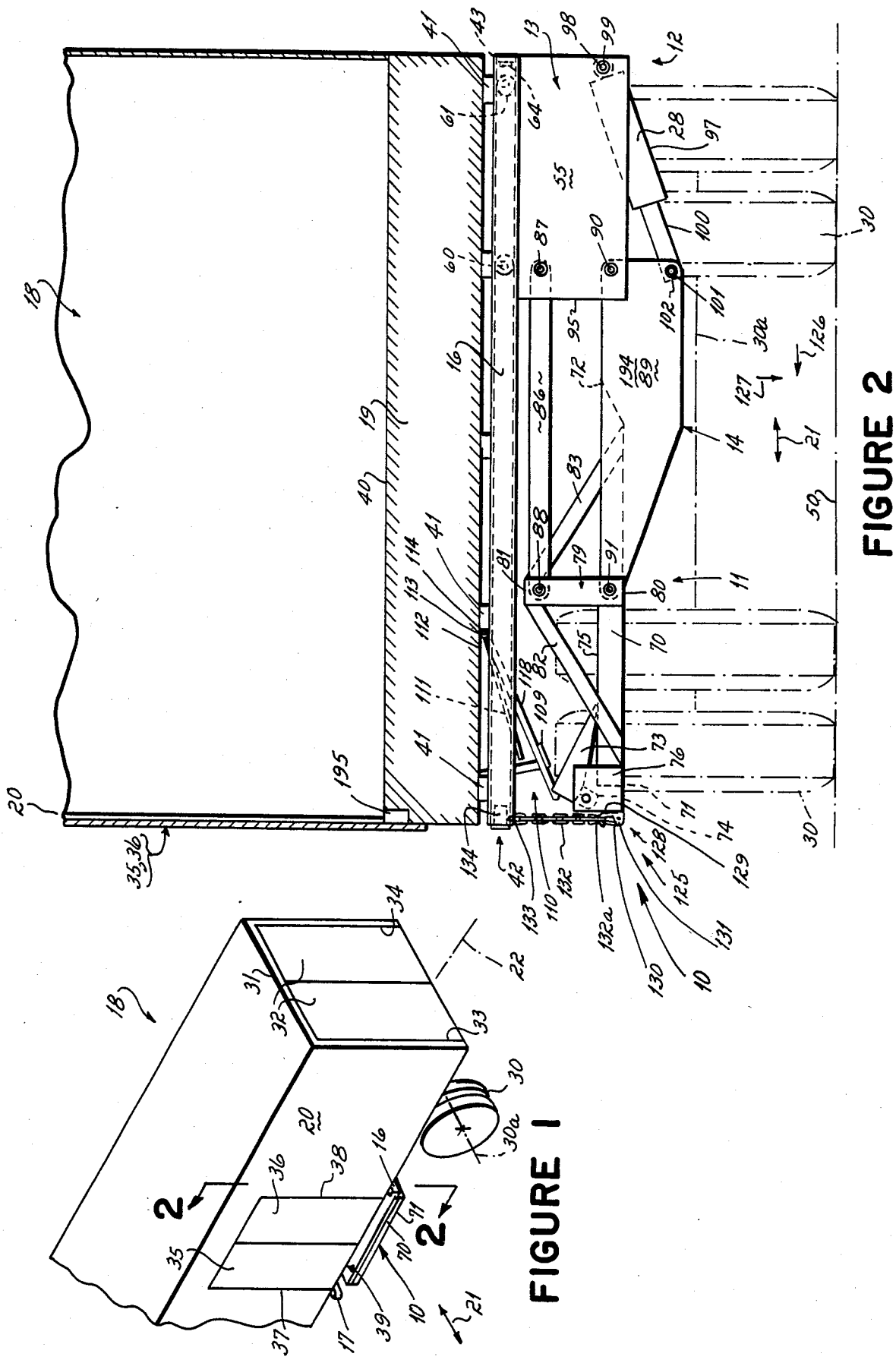
FIG. 1 is a perspective view of a truck body that provides a sidewall cargo opening served by a sideloader elevator platform in accord with the principles of this invention.
FIG. 2 is an end view taken along line 2—2 of FIG. 1, the sideloader elevator platform being shown in the storage or travel position.
Figure 3:
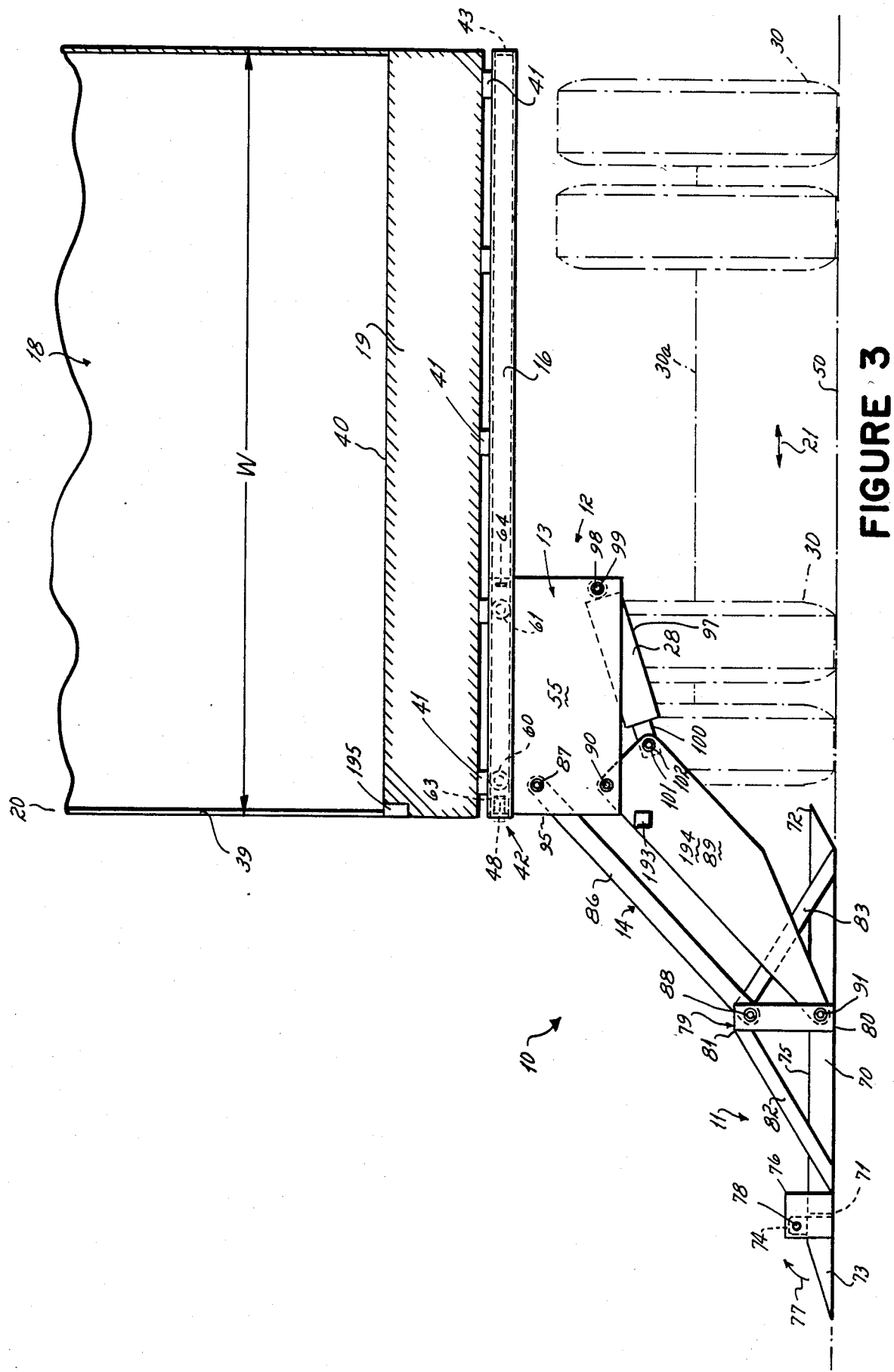
FIG. 3 is a view similar to FIG. 2, but illustrating the sideloader elevator platform in the lowermost elevator use position.

A sideloader elevator platform 10 in accord with the principles of this invention, as shown in FIGS. 2 and 3, basically includes a platform assembly 11 and a carriage assembly 12. The carriage assembly 12 includes carriage 13 and parallelogram linkages 14, 15, the platform assembly 11 being connected to the carriage by the parallelogram linkages. The carriage 13 itself is slidably carried on carriage rails 16, 17 fixed to the underside of a truck body 18. The carriage assembly 12 and, therefore, the platform assembly 11, is movable from a storage or travel position at which the platform assembly and the carriage assembly are completely located beneath the truck bed 19 (see FIG. 2) and an elevator use position at which the platform assembly is extended outwardly of the truck body's sidewall 20 but at which the carriage 13 remains positioned beneath the truck bed (see FIG. 3). A drive mechanism 23 that cooperates with carriage rails 16, 17 provides movement of the carriage 13 in a direction 21 transverse to the longitudinal axis 22 of the truck body. The drive mechanism 23 includes drive motor 24 mounted on the carriage 13 and a first drive element in the form of a drive chain 25 generally transverse to the truck body's longitudinal axis 22 and fixed to the truck bed 19 at both ends 26, 27 (see FIG. 5). The platform assembly 11 itself is raised and lowered in elevator fashion, when it is extended outboard of the truck body's sidewall 20 as shown in FIG. 3, by linear hydraulic motors 28, 29 that are connected between the carriage 13 and the parallelogram linkages 14, 15.

A vehicle body 18 with which the sideloader elevator platform 10 of this invention is adapted for use is shown in FIG. 1. The vehicle body is in the form of a truck body having sidewalls 20, a rear or end wall 31, and two pairs of rear tires 30 on an axle axis 30a. The truck body's end wall 31 is comprised of two rear doors 32 hinged at respective sidewall edges 33, 34 which open to provide a rear cargo opening (not shown). The truck body 18 also includes two sidewall doors 35, 36 which are hinged on their outside edges 37, 38 which open to provide a sidewall cargo opening 39. The truck body further includes, as shown in FIG. 2, a bed 19 which defines truck floor level 40. The truck bed 19 is reinforced with longitudinal support beams 41 spaced one from the other across the width W of that bed. The longitudinal support beams 41 are parallel to the longitudinal axis 22 of the truck body 18.

The carriage rails 16, 17 of the sideloader elevator platform are immobily fixed to the truck body's longitudinal support beams 41 which, in turn, are immobily fixed to the underside of the truck body's bed 18. These carriage rails 16, 17 are located transverse to the truck body,s longitudinal axis 22, and are in the form of C-shaped channels that are inwardly directed one toward the other. Each of these inwardly directed C-shaped channels 16, 17 carries stops 42, 43 at opposite ends thereof. The rails' stops 42, 43 cooperate with the carriage 13 to locate the carriage in the over-the-road storage position shown in FIG. 2 (relative to rear stops 43), and in the elevator use position shown in FIG. 3 (relative to front stops 42). The rear stops 43 are removably fixed to the carriage rails 16, 17, and the front stops 42 are also removably fixed to the rails. Each stop 42, 43 is the form of angle member 44 fixed to its rail 16 or 17 by bolt 45 on the exterior face 46 of that rail. The stop face 47 of each stop 42, 43 is established by stop block 48 fixed to angle member 44, the length 49 of that stop block being adjusted as described below depending on the height of the truck bed's floor level 40 relative to ground 50. In addition to the two carriage rails 16, 17, a roller chain 25 is stretched beneath the truck body's bed 18 in a direction transverse to the longitudinal axis 22 of the truck body 18. The roller chain 25 interacts with hydraulic drive motor 24 on the sideloader elevator platform's carriage 13 in a manner explained in greater detail below. The roller chain 25 is fixed at one end 26, e.g., by bolts (not shown) to extreme side edge longitudinal support beam 41a of the truck body 18, and is fixed at the other end 27, e.g., also by bolts (not shown) to the opposite extreme side edge longitudinal support beam 41b, both the beams 41a, 41b being adjacent opposite sidewalls 20 of the truck body 18. Note the overall length of the roller chain 25 is somewhat greater than the width W of the truck bed 19, but is not greater than one and one-half times the width W of the truck bed.

Figure 4:
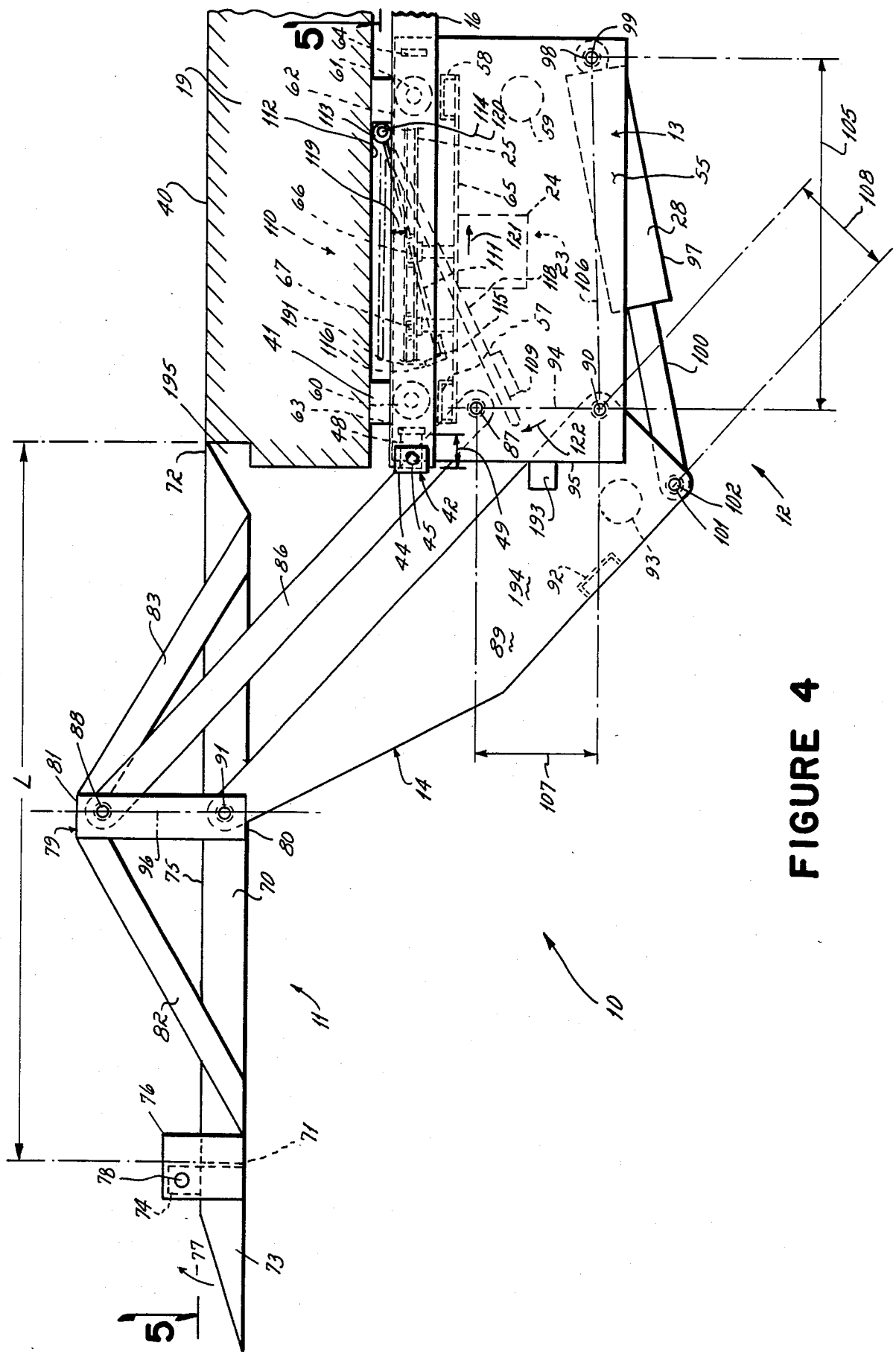
FIG. 4 is a view similar to FIG. 3 but showing the sideloader elevator platform in the uppermost elevator use position.
Figure 5:
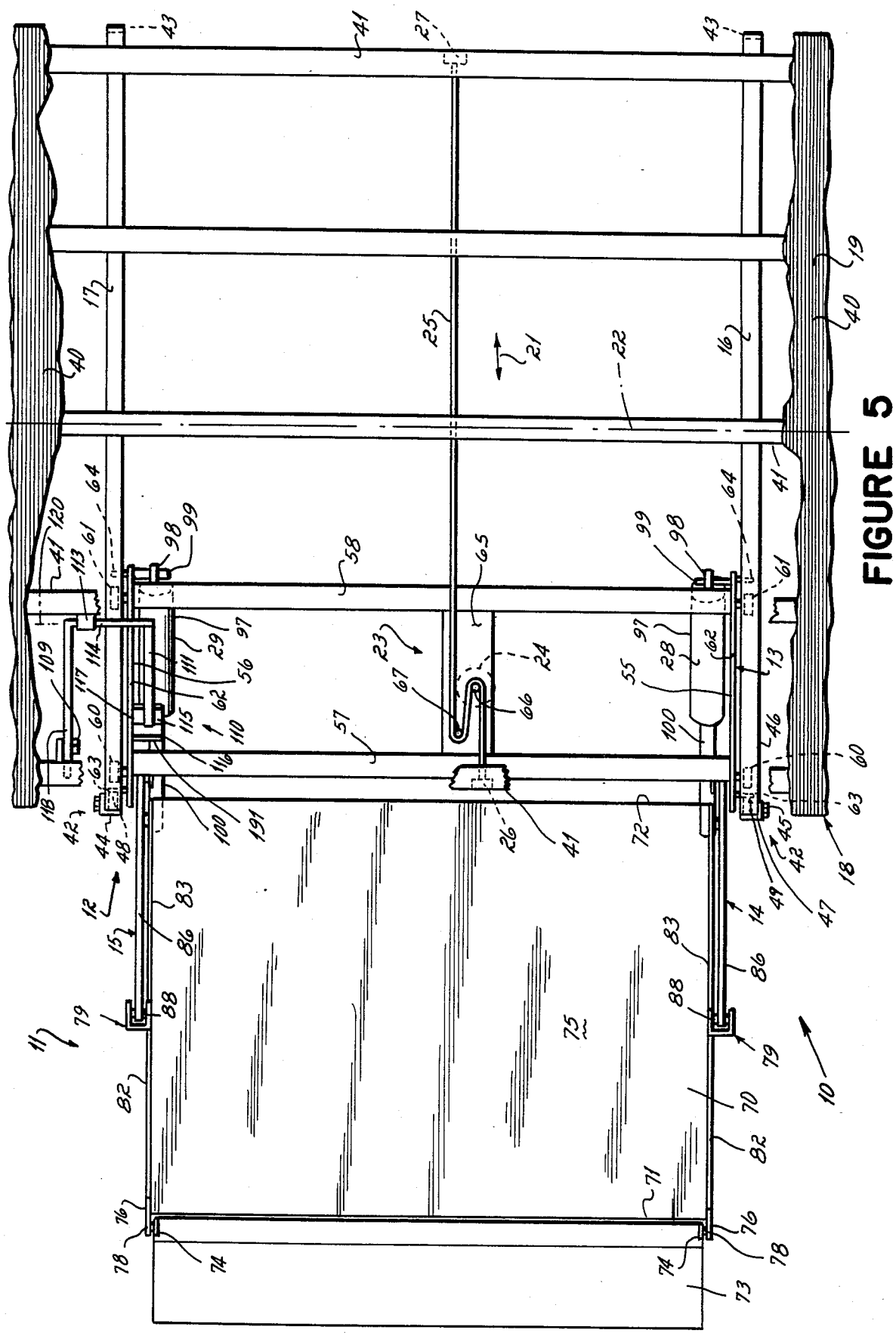
FIG. 5 is a cross-sectional view taken along 5—5 of FIG. 4.

The carriage assembly 12 of the sideloader elevator platform 10 is particularly shown in FIGS. 4 and 5. The carriage assembly 12 comprises a pair of opposed carriage slide plates 55, 56, the carriage slide plates being maintained in spaced and interconnected relation relative one to the other by cross beams 57-59 immobily fixed thereto. Each of the slide plates 55, 56 has a pair of rollers 60, 61 rotatably mounted along the top edge 62 thereof. The rollers 60, 61 extend outboard of each of the carriage's slide plates 55, 56, and are received in the C-shaped carriage rails. Each of the slide plates 55, 56 also mounts a front stop block 63 and a rear stop block 64 at the top edge 62 thereof, these stop blocks 63, 64 being positioned to cooperate with and abut against front 42 and rear 43 stops, respectively, carried by the carriage rails 16, 17. A drive mounting plate 65 is fixed centrally of the carriage slide plates 55, 56 to the top pair of cross beams 57, 58. The drive mounting plate 65 serves as a base for the drive motor 24 which carries a second drive element in the form of drive sprocket 66. The drive mounting plate 65 also serves as a base for an idler sprocket 67 journalled thereto. The drive chain 25 is trained around the drive sprocket 66 and the idler sprocket 67 in a generally S-shaped configuration, as shown in FIG. 5, so as to insure a driving interconnection of about 180° of the roller chain around the hydraulic motor's drive sprocket. Accordingly, the movable carriage assembly 13 is drivingly connected with the roller drive chain 25 that is fixed at opposite ends 26, 27 to the underside of the truck body's bed. And note particularly that the rear stops 64 on the carriage slide plates 55, 56 cooperate with rear stops 43 on the carriage rails 16, 17 to locate the carriage assembly 13 in the over-the-road storage or travel position as shown in FIG. 2, and that front stops 63 on the carriage slide plates cooperate with front stops 42 on the carriage rails 16, 17 to locate the carriage assembly in the elevator use position as shown in FIG. 3.

The platform assembly 11, as shown in FIGS. 2 and 3, includes a main platform 70 having a front edge 71 and a rear edge 72, and a ramp 73 pivotally connected to the main platform adjacent its front edge. The ramp 73 includes side ears 74 that extend above the platform's cargo surface 75, those ears being pivotally mounted to brackets 76 fixed adjacent to the main platform's front edge 71. The ramp 73 is stored on top of the main platform 70 by pivoting same in the direction shown by phantom arrow 77 in FIG. 3 into its storage position shown in FIG. 2. When in the FIG. 2 storage position, the ramp 73 is not apt to be jarred back into the elevator position shown in FIG. 3 because its hinge line 78 is above the cargo surface 75 of the main platform 70. The main platform 70 also includes, on each side thereof, a pivot post 79 fixed at its bottom end 80 to a side of the platform, each pivot post extending upwardly above the platform surface 75. The top end 81 of the pivot post, as shown in FIG. 3, is braced or reinforced through use of forwardly 82 and rearwardly 83 extending braces fixed to the top end of the pivot post at one end and fixed adjacent the front 71 and rear 72 edges of the platform at their other ends. Note particularly these pivot posts 79 are positioned substantially midway between the front 71 and rear 72 edges of the main platform 70.

The main platform 70 is interconnected with the carriage assembly 12 by an elevating mechanism that includes a parallelogram linkage 14, 15 and a linear hydraulic motor 28, 29 on each side of the platform. Each parallelogram linkage 14, 15 includes a tension arm 86 pivotally connected as at 87 at one end to a carriage slide plate 55 or 56 and pivotally connected as at 88 at the other end to the top end 81 of a platform pivot post 79. Each parallelogram linkage 14, 15 also includes a compression arm 89 in the form of a bellcrank that is pivotally connected as at 90 at its elbow to a carriage slide plate 55 or 56 and pivotally connected as at 91 at one end to the bottom end 80 of a platform pivot post 79. The compression arms 89 of the two parallelogram linkages 14, 15 are immobily fixed together by front 92 and rear 93 cross beams. The pivot connections 87, 90 of the tension arm 86 and compression arm 89 with each carriage slide plate 55, 56 are on a line 94 which is, and which remains at all times, generally perpendicular relative to ground 50, and are closely adjacent the leading or front edge 95 of the carriage slide plates. The pivot connections 88, 91 of the tension arm 86 and compression arm 89 with each platform pivot post 79 are also on a line 96 which is, and which remains at all times, perpendicular relative to ground 50. A linear extension hydraulic motor 28, 29 is interconnected with its respective carriage slide plate 55 or 56 and the associated compression arm 89 of its respective parallelogram linkage 14, 15. The cylinder 97 of each hydraulic motor 28, 29 is pivotally connected as at 98 on pin 99 at the cylinder's free end to the trailing or rear edge of its respective carriage slide plate 55 or 56 and the free end of piston rod 100 of each hydraulic motor is pivotally connected as at 101 on pin 102 to its respective compression arm 89 at the other end 103 of the compression arm which also is pivotally fixed as at 90 to the carriage slide plate.

Note that the distance 105 between the pivot connection 90 of each compression arm 89 with its respective carriage slide plate 55 or 56, and the pivot connection 98 of the associated hydraulic motor 28 or 29 with that slide plate, is substantially equal to about one-half the length L of the main platform 70. Also in this connection, note that the pivot connection 90 of each compression arm 89 with its respective carriage slide plate 55 or 56, and the pivot connection 98 of the associated hydraulic motor 28 or 29 with that slide plate, both lie on a phantom line 106 which is substantially parallel to ground. Also, note that the distance 107 between the pivot connection 87 of each tension arm 86 with its respective carriage slide plate 55 or 56, and the pivot connection 90 of the associated compression arm 89 with that carriage slide plate, is substantially equal to the distance 108 between the pivot connection of that compression arm 89 with that carriage slide plate and the pivot connection 101 of the associated hydraulic motor 28 or 29 with that compression arm. And importantly in this regard, note particularly that the pivot connection 101 of each hydraulic motor 28 or 29 with its associated compression arm 89 is located such that that pivot connection 101 is always beneath the pivot connection 90 of that compression arm with the associated carriage slide plate 55 or 56 no matter what the height of the platform 70 is relative to ground 50 during use of the sideloader elevator platform 10 as an elevator, compare FIGS. 3 and 4. This spatial relationship of the pivot points 87, 90, 98, 101 on each of the carriage slide plates 55, 56 insures that the hydraulic motors 28, 29 are always providing compressive forces on the parallelogram linkages/compression arms 89 as the cargo platform 70 is being raised during use of the apparatus as an elevator, thereby always pushing on the linkages 14 and 15 to raise the platform from the ground position of FIG. 3 to the truck bed level position of FIG. 4.

A novel latch system insures the sideloader elevator platform 10, i.e., the carriage assembly 12 and platform assembly 11, is retained in the extended position when it is desired to use the platform 10 as an elevator, and insures the carriage assembly and platform assembly is retained wholly beneath the truck body's bed 19 and above axle centerline 30a of the truck's wheels 30 when in the storage or travel position. The latch system includes a manually operated latch 110 provided to restrain the carriage assembly 12 and, therefore, the platform assembly 11 linked thereto, in the extended or elevator use position shown in FIG. 3. This manual latch 110 includes a latch bolt 111 pivotally mounted on swing axis 120 to the underside 112 of the truck body's bed 19 through use of collar 113 and hinge pin 114. The latch bolt 111 is adapted to be located in a latch seat 115 defined by angle member 116 fixed to the inside face 117 of carriage slide plate 56. A handle 118 fixed to hinge pin 114 for the latch bolt 111 is provided to release the latch bolt from the latch seat 115. The handle 118 is positioned outboard of the carriage assembly 13, as shown in FIG. 5. Note the latch bolt 111 is located at an angle 119 less than 45° relative to ground when interengaged in latched relation with the carriage assembly 13 as shown in FIG. 4.

As the carriage assembly 12 is extended from the storage position shown in FIG. 2 to the elevator use position shown in FIG. 3, and since the manual latch 110 is normally held in a disconnected or storage position as shown in FIG. 4 by virtue of a stop 109 engaged by handles 118, the carriage assembly's angle 119 tends to cam the latch bolt 111 automatically up and over that angle so the bolt can drop into the latch seat 115 when the carriage assembly reaches the elevator use position shown in FIG. 3. When the latch bolt 111 is so located in the latch seat 115, it will be understood that motion of the carriage assembly 13 in the direction shown by phantom arrow 121 back toward the storage position is not possible. When it is desired to move the carriage assembly 13 from the elevator use position shown in FIG. 3 back into the storage position shown in FIG. 2, handle 118 is simply grasped by the apparatus' operator and lifted upwardly in the direction shown by phantom arrow 122 until the latch bolt 111 is lifted out of the latch seat 115. With the latch bolt 111 held in the upraised or disengaged position (shown in phantom lines in FIG. 4), the carriage assembly 13 is then moved back toward the storage position in the direction of phantom arrow 121.

The latch system also includes a snap hook latch 125 to retain platform assembly 11 and carriage assembly 13 in the storage position shown in FIG. 2. This snap hook latch 125 provides two functions in that it retains carriage assembly 13 in the storage position shown in FIG. 2, and against lateral motion in the direction shown by phantom arrow 126, and also holds the cargo platform 70 itself in the mid-elevational attitude whereat tension and compression arms are substantially parallel relative to ground (which is the over-the-road travel position of the sideloader elevator platform 10) against downward motion in the direction shown by phantom arrow 127. The snap hook latch 125 is duplicated on opposite sides of the sideloader elevator platform 10. Each side of the sideloader elevator platform 10 includes a snap hook 128 immobily fixed adjacent the leading edge 71 of cargo platform 70. The snap hook 128 includes an inverted C-shaped hook 129 that cooperates with a spring (not shown) loaded bail 130 pivotally mounted as at 131 to that hook, the spring loaded bail constantly being biased toward the closed position shown in FIG. 2. Each side of the sideloader elevator platform 10 also includes a short length of link chain 132 immobily fixed at end 133 to the outside face 134 of the associated C-shaped carriage rail 16, 17. When the sideloader elevator platform 10 is in the storage or travel position shown in FIG. 2, the bottom link 132a of each link chain is simply interconnected with its associated snap hook 128 on both sides of the sideloader elevator platform.

This prevents the platform assembly 11 and carriage assembly 12 from moving out of the storage position in the direction shown by phantom arrow 126 toward the outwardly extended use position, and this also prevents the platform 70 from dropping down toward ground 50 in the direction of phantom arrow 127, as the truck body 18 travels over the road.

Figure 6:
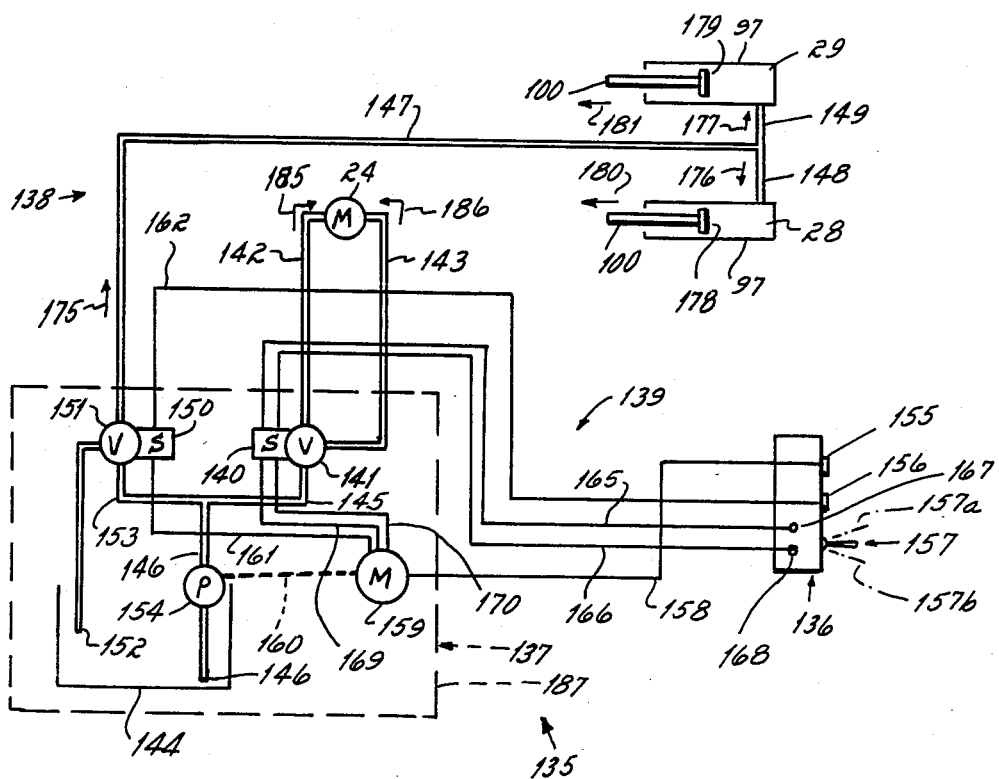
FIG. 6 is a schematic view illustrating the hydraulic control circuit for the sideloader elevator platform.

The control circuit 135 by which the sideloader elevator platform 10 is operated and controlled is particularly shown in FIG. 6. An electric switch unit 136 controls a hydraulic unit 137 that services the hydraulic rotary motor 24 which moves the carriage assembly 12 between its over-the-road travel or storage position shown in FIG. 2, and the outwardly extended elevator use position shown in FIG. 3. The switch unit 136 also controls the hydraulic linear motors 28, 29 connected with the linkage assemblies 14, 15 which raise and lower the cargo platform 70 in elevator fashion. More specifically, the control circuit 135 includes a hydraulic circuit 138 and an electric circuit 139 interconnected one with the other. The hydraulic circuit 138 includes a solenoid 140 operated in/out valve 141 connected with hydraulic rotary motor 24 by first 142 and second 143 hydraulic lines, and connected with hydraulic fluid reservoir 144 by pump line 145, 146. The hydraulic circuit 138 also includes a single infeed/outfeed hydraulic line 147 connected with branch lines 148, 149 that serve hydraulic linear motors 28, 29. A solenoid 150 operated up/down valve 151 is connected with the infeed/outfeed line 147, and is connected with the hydraulic fluid reservoir 144 either through drain line 152 or through pump line 153, 146. The pump line 146 includes a fluid pump 154.

The electric circuit 139 includes, as part of the switch unit 136, an elevator up switch 155, an elevator down switch 156, and a spring loaded toggle switch 157 that provides carriage-in switch position 157a and a carriage-out switch position 157b. The elevator up switch 155 is electrically connected by line 158 to an electric motor 159 (which is connected by mechanical drive 160 to fluid pump 154). Line 161 connects the motor 159 with solenoid 150 which controls the up/down valve 151. The up/down solenoid 150 is also connected by electric line 162 with the elevator-down switch 155, thereby completing the up/down electric circuit 158, 161, 162 which controls the motor 159 for the hydraulic fluid pump 154 as well as the solenoid 150 for the up/down valve 151. The up switch 155 and the down switch 156 are both spring loaded open, i.e., must be held in against an outward bias of a switch spring (not shown) to maintain an operative electric circuit. The electric circuit 139 also includes, as part of the switch unit 136, a toggle switch 157 that provides carriage-in switch position 157a and carriage-out switch position 157b. The toggle switch 157 is constantly spring (not shown) loaded to a neutral position shown in solid lines in FIG. 6. The phantom line in position 157a or phantom line out position 157b is achieved by manually holding the toggle switch 157 in either of those positions against the bias of the switch spring. Contact 167 of the in switch position 157a is connected by line 165 to solenoid 140 of in/out valve 141. Line 166 connects out switch contact 168 with solenoid 140 of in/out valve 141. Lines 169 and 170 complete the electric circuit between in/out solenoid 140 and the electric motor 159 for the hydraulic fluid pump 154.

In the up mode of the control circuit 135, the motor 159 operates fluid pump 154 to force hydraulic fluid up line 146, 153 and through fluid lines 147–149 in the direction shown by arrows 175–177 to push the hydraulic pistons 178, 179 in the direction shown by arrows 180, 181, thereby lifting or elevating the cargo platform 70. In the down mode of the control circuit 135, the motor 159 is simply shut off so that the pump 154 does not operate, the solenoid 150 switches the valve 151 to the drain line 152, and hydraulic fluid is simply allowed to drain through hydraulic lines 147–149 and the drain line back into the reservoir 144, thereby permitting the platform 70 to fall or lower, i.e., not be driven, by virtue of its own weight. In the carriage in mode of the control circuit 135 where the carriage assembly 13 is being withdrawn into the storage position, the toggle switch 157 is held in the phantom line position 157a, thereby energizing motor 159 for the pump 154 to draw hydraulic fluid continuously from the reservoir 144, and to switch solenoid 140 operated valve 141 into a first position where the fluid is circulated in the clockwise direction 185 within hydraulic fluid line circuit 142, 143 that includes the in/out motor 124 and that valve 141. Alternatively, and in the carriage out mode of the control circuit 135, the toggle switch 157 is held in the phantom line position 157b for locating the solenoid operates valve in a second position where the motor 159 driven pump 154 is energized and hydraulic fluid is circulated in the hydraulic line 142, 143 circuit in counter clockwise direction 186. The electric motor 159, hydraulic pump 154, solenoid operated valves 141, 151 and hydraulic fluid reservoir 144 may all be located in a compact housing 187 mounted beneath the truck body's bed 19 in a position not shown, if desired.

Use of the elevator platform system 10 of this invention is particularly illustrated in FIGS. 2–4. FIG. 2 shows the sideloader elevator platform 10 in the over-the-road travel or storage position. In this storage position, which position is established by rear stop blocks 64 of the carriage's slide plates 55, 56 abutting rear stops 43 on carriage rails 16, 17, the snap latches 125 cooperate with chains 132 to hold the carriage 13 in that storage position, and also holds the elevator platform 70 in the storage position so it cannot drop toward ground 50. This over-the-road storage position is preferably that position at which the tension arm 86 and compression arm 89 of the parallelogram linkages 14, 15 are substantially parallel to ground, this posture having been attained through use of the sideloader elevator platform's control circuit 135 as shown in FIG. 6 and described in detail above.

When it is desired to extend the sideloader elevator platform 10 from the storage position of FIG. 2 to the elevator use position shown in FIGS. 3 and 4, the snap latches 125 are disconnected, and the control circuit 135 operated in a manner described above so that hydraulic motor 124 rotates drive sprocket 66 in a clockwise direction as shown in FIG. 5. Clockwise rotation of drive sprocket 66 as shown in FIG. 5 causes that drive sprocket to walk along the roller chain and this, in turn, causes the carriage assembly 13 itself to roll along rails 16, 17 toward that sidewall 20 of the truck's body that includes side doors 35, 36. The carriage assembly 13 extends toward sidewall 20 of the truck's body 18 until the carriage's slide plates 55, 56 abut front stops 42 on the carriage rails 16, 17. As the carriage assembly 13 moves toward the front stops 42, latch bolt 111 of the manual latch 110 is cammed over the top front edge 191 of the latch angle 116 fixed to slide plate 56, the latch bolt dropping into latch seat 115 as the carriage's slide plates abut the front stops in final or extended most elevator use position of the sideloader elevator platform 10. Thus, manual automatic latch 110 positively locates and restrains the carriage assembly 13 in that elevator use position. With the main platform 70 so extended, the platform's ramp 73 is pivoted into the use position shown in FIGS. 3 and 4.

Thereafter, the elevator platform 70 can be raised and lowered, through use of the linear hydraulic motors 28, 29 and the control circuit 135 as previously discussed and as is illustrated in FIG. 6. The elevator platform 70 is positively located in the truck bed floor 40 position shown in FIG. 4 by virtue of up stops 193 immobily fixed on the outside faces 194 of the compression arms 89 abutting against front edges 95 of the carriage's slide plates 55, 56. When the compression arms' up stops 193 so abut the front edges 95 of the carriage's slide plates, the rear edge 72 of platform 70 is received in longitudinal recess 195 of the truck body's bed 19 at the side cargo opening 39 of the truck body 18. This longitudinal recess 195 permits the cargo surface 75 of the platform 70 to be positioned in a coplanar attitude with the cargo surface 40 of the truck bed 19 so as to enhance loading and unloading of the truck body 18 through use of the cargo platform.

Movement or retraction of the carriage assembly 13 from the extended or elevator use position shown in FIGS. 3 and 4 to the over-the-road storage position shown in FIG. 2, and preliminary movement of the cargo platform 70 from an elevator position to a storage position where the tension arms 86 and compression arms 89 are horizontal relative to ground, are achieved in a reverse sequence of steps relative to that just described for the movement of the sideloader elevator platform 10 from the over-the-road storage position to the elevator use position.

Having described in detail the preferred embodiment of my invention, what I desire to claim and protect by Letters Patent is:

1. An elevator platform assembly for a truck body, said truck body being of the type having a bed, first and second parallel sidewalls, and a cargo opening in said first sidewall, said assembly comprising
    a framework mountable in fixed position to the underside of said truck body's bed,
    a carriage connected to said framework, said carriage being supported relative to ground solely by said framework, said carriage being movable along said framework in a generally straight line between an elevator position where said carriage is positioned adjacent but not beyond said first sidewall, and a storage position where said carriage is positioned adjacent but not beyond said second sidewall, the motion path of said carriage between said storage and elevator positions when installed being generally perpendicular to the truck body's longitudinal axis, said carriage thereby remaining entirely beneath said truck body's bed and between said truck body's sidewalls at all times during movement between said elevator and storage positions as well as when at said elevator and storage positions,
    a cargo platform connected to said carriage, said platform extending beyond one end of said carriage in both the elevator and storage positions of said carriage, said platform also being movable in a generally straight line between said elevator position and storage position because of its connection with said carriage, said platform being positioned beyond said first sidewall when said carriage is in said elevator position and positioned between said first and second sidewalls beneath said bed when said carriage is in said storage position, said platform being movable in elevator fashion between an upper cargo handling position at floor level of said truck body and a lower cargo handling position at ground level,
    an up/down mechanism connecting said carriage and said cargo platform for raising and lowering said platform in said elevator fashion relative to ground,
    a first drive element positioned beneath said truck body's floor, said first element being of a length that extends substantially the entire width of said floor, said first element being fixably connectable at one end to said truck body adjacent said first sidewall, and fixably connectable at the other end to said truck body adjacent said second sidewall, said first element remaining fixed in location relative to said truck body during movement of said carriage between its storage and elevator positions, and
    a second drive element mounted on said carriage, said second element being connected with said first element so that movement of one of said elements relative to said carriage causes said carriage to move between its storage and elevator positions.

2. An elevator platform assembly as set forth in claim 1, said first and second elements comprising
    a drive chain and a drive sprocket, said drive chain being oriented generally parallel to the linear motion path of said carriage as it moves between said storage and elevator positions.

3. An elevator platform assembly as set forth in claim 2, said assembly comprising
    an idler sprocket mounted to said carriage, said drive chain being trained around both said drive sprocket and said idler sprocket in a generally S-shaped configuration to insure inter-engagement of said drive chain and said drive sprocket as said carriage moves between said storage and elevator positions, and
    a drive motor mounted to said carriage, said drive motor being connected with said drive sprocket.

4. An elevator platform assembly as set forth in claim 1, said assembly comprising
    at least one carriage rail as part of said framework, and at least one roller mounted to said carriage, said carriage being adapted to roll between said storage and elevator positions along said carriage rail, and
    front and rear carriage stops mounted to said carriage rail, said carriage stops being located to stop said carriage, respectively, in said elevator and storage positions.

5. An elevator platform assembly as set forth in claim 4, at least one of said front stop and said rear stop being removably mounted to said carriage rail for permitting said carriage and said platform to be disengaged from said framework.

6. An elevator platform assembly for a truck body, said truck body being of the type having a bed, first and second parallel sidewalls, and a cargo opening in said first sidewall, said assembly comprising
    a framework mountable in fixed position to the underside of said truck body's bed,
    a carriage connected to said framework, said carriage being supported relative to ground solely by said framework, said carriage being movable along said framework in a generally straight line between an elevator position where said carriage is positioned adjacent but not beyond said first sidewall, and a storage position where said carriage is positioned adjacent but not beyond said second sidewall, the motion path of said carriage between said storage and elevator positions when installed being generally perpendicular to the truck body's longitudinal axis, said carriage thereby remaining entirely beneath said truck body's bed and between said truck body's sidewalls at all times during movement between said elevator and storage positions as well as when at said elevator and storage positions, a cargo platform connected to said carriage, said platform extending beyond one end of said carriage in both the elevator and storage positions of said carriage, said platform also being movable in a generally straight line between said elevator position and said storage position because of its connection with said carriage, said platform being positioned beyond said first sidewall when said carriage is in said elevator position and positioned between said first and second sidewalls beneath said bed when said carriage is in said storage position, said platform being movable in elevator fashion between an upper cargo handling position at floor level of said truck body and a lower cargo handling position at ground level, a linkage connecting said carriage and said cargo platform for raising and lowering said platform relative to ground, said linkage comprising a compression arm in the form of a bellcrank pivotally connected at its elbow to said carriage and pivotally connected at one end to said platform, said linkage comprising a tension arm pivotally connected at one end to said carriage and pivotally connected at the other end to said platform, said compression arm and said tension arm comprising a parallelogram linkage, and a linear fluid motor connected with said linkage for raising and lowering said cargo platform in elevator fashion, said motor being pivotally connected at one end to said carriage, the other end of said motor being pivotally connected to the other end of said compression arm, said fluid motor's pivot connection with said compression arm being located on one side of a phantom linear line that includes the pivot connections of said tension and compression arms with said carriage when said platform is at ground level position, and being located on the other side of said phantom line when said platform is at floor level position with said truck body, said motor's pivot connection with said carriage thereby swinging back and forth over said phantom line as said platform is lowered and raised in elevator fashion.

7. An elevator platform assembly as set forth in claim 6, the distance between the pivot connections of said tension and compression arms with said carriage being substantially the same as the distance between the pivot connection of said compression arm with said carriage and the pivot connection of said compression arm with said motor, the pivot connections of said tension and compression arms with said carriage, and of said motor with said compression arm, all being on the same phantom linear line at one position of said platform between its ground level and truck bed level locations.

8. An elevator platform assembly as set forth in claim 7, said phantom linear line being substantially vertical relative to ground when said tension and compression arms are substantially parallel relative to ground.

9. An elevator platform assembly as set forth in claim 8, the storage position of said cargo platform being substantially parallel relative to ground and at a location between said upper and lower cargo handling positions, and said tension and compression arms being substantially parallel relative to ground, when said cargo platform is in said storage position.

10. An elevator platform assembly as set forth in claim 7, said motor's pivot connection with said carriage and said compression arm's pivot connection with said carriage being in a linear line substantially parallel relative to ground, said tension arm's pivot connection with said carriage and said compression arm's pivot connection with said carriage being on a phantom linear line substantially normal to ground, and said tension arm's pivot connection with said platform and said compression arm's pivot connection with said platform also being on a linear line substantially normal to ground.

11. An elevator platform assembly as set forth in claim 6, said tension and compression arms being pivotally connected to the leading end of said carriage and said motor being pivotally connected to the trailing end of said carriage.

12. An elevator platform assembly as set forth in claim 6, said assembly comprising
an up stop fixed to one of said tension and compression arms, said up stop being adapted to abut said carriage to locate said platform at floor level of said truck body in upper cargo handling position.

13. An elevator platform assembly as set forth in claim 6, said assembly comprising
at least one carriage rail as part of said framework, and at least one roller mounted to said carriage, said carriage being adapted to roll along said carriage rail between said storage and elevator positions, and
front and rear carriage stops mounted to said framework, said carriage stops being located to stop said carriage, respectively, in said elevator and storage positions.

14. An elevator platform assembly for a truck body, said truck body being of the type having a bed, first and second parallel sidewalls, and a cargo opening in said first sidewall, said assembly comprising
a framework mountable in fixed position to the underside of said truck body's bed,
a carriage connected to said framework, said carriage being supported relative to ground solely by said framework, said carriage being movable along said framework in a generally straight line between an elevator position where said carriage is positioned adjacent but not beyond said first sidewall, and a storage position where said carriage is positioned adjacent but not beyond said second sidewall, the motion path of said carriage between said storage and elevator positions when installed being generally perpendicular to the truck body's longitudinal axis, said carriage thereby remaining entirely beneath said truck body's bed and between said truck body's sidewalls at all times during movement between said elevator and storage positions as well as when at said elevator and storage positions, a cargo platform connected to said carriage, said platform extending beyond one end of said carriage in both the elevator and storage positions of said carriage, said platform also being movable in a generally straight line between said elevator position and said storage position because of its connection with said carriage, said platform being positioned beyond said first sidewall when said carriage is in said elevator position and positioned between said first and second sidewalls beneath said bed when said carriage is in said storage position, said platform being movable in elevator fashion between an upper cargo handling position at floor level of said truck body and a lower cargo handling position at ground level, an up/down mechanism connecting said carriage and said cargo platform for raising and lowering said platform in elevator fashion relative to ground, and an elevator position latch having a latch bolt pivotably carried by said framework and a latch seat carried by said carriage, said elevator position latch functioning to retain said carriage in said elevator position, said latch bolt being disengaged from said latch seat in all positions of said carriage except said elevator position thereof, said latch bolt continuously being in a ready position to engage said latch seat as said carriage moves toward said elevator position from said storage position, said latch seat cooperating with said latch bolt to cam said latch bolt out of said ready position into said latch seat as said carriage moves into said elevator position from said storage position, said latch bolt falling into said latch seat when said carriage achieves said elevator position.

15. An elevator platform assembly as set forth in claim 14, said assembly comprising
at least one carriage rail as part of said framework, said carriage being movable along said carriage rail between said storage and elevator positions, and
a front carriage stop mounted to said carriage rail, said front carriage stop functioning to locate said carriage in said elevator position, and said elevator position latch functioning to prevent said carriage from moving toward said storage position after being moved to said carriage position, thereby restraining said carriage and platform in said elevator position.

16. An elevator platform assembly as set forth in claim 15, said assembly comprising
a handle connected with said elevator position latch, said handle permitting said latch bolt to be manually disengaged from said latch seat when it is desired to move said carriage from said elevator position to said storage position.

17. An elevator platform assembly as set forth in claim 15, said assembly comprising
a storage position latch partially carried by said framework and partially carried by said platform, said storage position latch being separate from said elevator position latch, said storage position latch functioning to retain said carriage in said storage position, and said storage latch also functioning to retain said cargo platform in an over-the-road storage position which is between said upper and lower cargo handling positions.

18. An elevator platform assembly as set forth in claim 17, said storage position latch comprising
a hook fixed to one of said framework and said platform, and an eye fixed to the other of said framework and said platform, said hook and eye being connectable one with the other when said carriage is in said storage position and when said platform is located substantially above ground level adjacent the underside of said truck body's bed.

19. An elevator platform assembly for a truck body, said truck body being of the type having a bed, first and second parallel sidewalls, and a cargo opening in said first sidewall, said assembly comprising
a framework mountable in fixed position to the underside of said truck body's bed,
a carriage connected to said framework, said carriage being supported relative to ground solely by said framework, said carriage being movable along said framework in a generally straight line between an elevator position where said carriage is positioned adjacent but not beyond said first sidewall, and a storage position where said carriage is positioned adjacent but not beyond said second sidewall, the motion path of said carriage between said storage and elevator positions when installed being generally perpendicular to the truck body's longitudinal axis, said carriage thereby remaining entirely beneath said truck body's bed and between said truck body's sidewalls at all times during movement between said elevator and storage positions as well as when at said elevator and storage positions,
a cargo platform connected to said carriage, said platform extending beyond one end of said carriage in both the elevator and storage positions of said carriage, said platform also being movable in a generally straight line between said elevator position and said storage position because of its connection with said carriage, said platform being positioned beyond said first sidewall when said carriage is in said elevator position and positioned between said first and second sidewalls beneath said bed when said carriage is in said storage position, said platform being movable in elevator fashion between an upper cargo handling position at floor level of said truck body and a lower cargo handling position at ground level, and said platform having an edge remote from said carriage which is located adjacent said first sidewall which is parallel to the truck body's longitudinal axis when said platform is in said storage position,
an up/down mechanism connecting said carriage and said cargo platform for raising and lowering said platform in elevator fashion relative to ground, and
a storage position latch partially carried by said framework at a location adjacent said first sidewall and partially carried by said platform at a location adjacent said platform's remote edge, said storage position latch functioning to retain said carriage in said storage position so that said carriage cannot significantly move toward said elevator position, and said storage latch also functioning to retain said cargo platform in an over-the-road storage position which is between said upper and lower cargo handling positions so that said platform cannot significantly drop toward ground.

20. An elevator platform assembly as set forth in claim 19, said storage position latch comprising
a hook fixed to one of said framework and said platform, and an eye fixed to the other of said framework and said platform, said hook and eye being connectable one with the other when said carriage is in said storage position and when said platform is located substantially above ground level adjacent the underside of said truck body's bed.

21. An elevator platform assembly as set forth in claim 19, said assembly comprising an elevator position latch having a latch bolt pivotably carried by said framework and a latch seat carried by said carriage, said latch bolt being disengaged from said latch seat in all positions of said carriage except said elevator position thereof, said latch bolt continuously being in a ready position to engage said latch seat as said carriage moves toward said elevator position from said storage position, said latch seat cooperating with said latch bolt to cam said latch bolt out of said ready position into said latch seat as said carriage moves into elevator position from said storage position, said latch bolt falling into said latch seat when said carriage achieves said elevator position.

22. An elevator platform assembly as set forth in claim 21, said assembly comprising at least one carriage rail as part of said framework, said carriage being movable along said carriage rail between said storage and elevator positions, and a front carriage stop mounted to said carriage rail, said front carriage stop functioning to locate said carriage in said elevator position, and said elevator position latch functioning to prevent said carriage from moving toward said storage position after being moved to said carriage position, thereby retaining said carriage and platform in said elevator position.

23. An elevator platform assembly as set forth in claim 21, said assembly comprising a handle connected with said elevator position latch, said handle permitting said latch bolt to be manually disengaged from said latch seat when it is desired to move said carriage from said elevator position to said storage position.

* * * * *